(12) United States Patent
Pelizzoni et al.

(10) Patent No.: US 8,475,920 B2
(45) Date of Patent: Jul. 2, 2013

(54) CABLE WITH ENVIRONMENTAL STRESS CRACKING RESISTANCE

(75) Inventors: Andrea Pelizzoni, Bovisio Masciago (IT); Luca Castellani, Milan (IT); Franco Peruzzotti, Legnano (IT); Cristiano Puppi, Guanzate (IT)

(73) Assignee: Prysmian Cavi E Sistemi Energia SRL, Milan (IT)

( * ) Notice: Subject to any disclaimer, the term of this patent is extended or adjusted under 35 U.S.C. 154(b) by 1304 days.

(21) Appl. No.: 11/570,916

(22) PCT Filed: Jun. 28, 2004

(86) PCT No.: PCT/EP2004/007057
§ 371 (c)(1),
(2), (4) Date: Aug. 20, 2008

(87) PCT Pub. No.: WO2006/000244
PCT Pub. Date: Jan. 5, 2006

(65) Prior Publication Data
US 2009/0202828 A1    Aug. 13, 2009

(51) Int. Cl.
*B32B 15/02* (2006.01)
*H01B 3/44* (2006.01)
*G02B 6/00* (2006.01)

(52) U.S. Cl.
USPC .... 428/379; 428/375; 428/383; 174/110 PM; 174/113 R; 174/120 SC; 385/123; 385/144; 385/145

(58) Field of Classification Search
None
See application file for complete search history.

(56) References Cited

U.S. PATENT DOCUMENTS 2,674,619 A    4/1954 Lundsted
2,953,541 A    9/1960 Pecha et al.
(Continued)

FOREIGN PATENT DOCUMENTS

DE    261798    3/1983
EP    814485    12/1997
(Continued)

OTHER PUBLICATIONS

"ELVAX" Product Data sheet, 2007.*
(Continued)

*Primary Examiner* — Jill Gray
(74) *Attorney, Agent, or Firm* — Norris McLaughlin & Marcus, P.A.

(57) ABSTRACT

Cable including at least one core comprising at least one transmissive element and at least one coating layer made of a coating material, wherein said coating material comprises: —at least one polyethylene; —at least one non-ionic surfactant having the following general formula (I): wherein: —Q is a p-functional group; —R is a linear or branched $C_1$-$C_4$ alkyl group, preferably a methyl group; —$R_1$ is a hydrogen atom or a linear or branched $C_1$-$C_6$ alkyl group, preferably a hydrogen atom; —n is an integer from 2 to 5 inclusive, preferably 2; —x is an integer from 5 to 500 inclusive, preferably from 10 to 300 inclusive; —y is an integer from 0 to 500 inclusive, preferably from 10 to 300 inclusive; —z is an integer from 0 to 500 inclusive, preferably from 10 to 300 inclusive; —y+z is not lower than 2; —p is an integer from 1 to 4 inclusive, preferably 1 or 4; provided that, when the transmissive element is an electrical energy transmissive element, said at least one coating layer is an external sheathing layer. Preferably, said coating layer is an external sheathing layer having a protective function.

55 Claims, 4 Drawing Sheets

U.S. PATENT DOCUMENTS

| | | | |
|---|---|---|---|
| 3,036,118 A | | 5/1962 | Jackson et al. |
| 3,303,152 A | | 2/1967 | Harvey et al. |
| 3,422,055 A | | 1/1969 | Maloney |
| 3,533,976 A | * | 10/1970 | Eidman ............... 524/333 |
| 4,230,831 A | * | 10/1980 | Sakurai et al. ............ 525/240 |
| 4,312,918 A | | 1/1982 | Bostwick |
| 4,336,352 A | * | 6/1982 | Sakurai et al. ............ 525/240 |
| 4,430,468 A | * | 2/1984 | Schumacher ............ 524/109 |
| 4,444,975 A | * | 4/1984 | Pokorny ................ 528/49 |
| 4,547,551 A | * | 10/1985 | Bailey et al. ............ 525/240 |
| 4,851,463 A | * | 7/1989 | Opsahl et al. ............ 524/109 |
| 5,298,540 A | * | 3/1994 | Pauquet et al. ............ 524/94 |
| 6,086,792 A | * | 7/2000 | Reid et al. ............... 252/511 |
| 6,087,000 A | * | 7/2000 | Girgis et al. ............ 428/392 |
| 6,162,548 A | | 12/2000 | Castellani et al. |
| 6,495,760 B1 | | 12/2002 | Castellani et al. |
| 6,521,695 B1 | * | 2/2003 | Peruzzotti et al. ............ 524/505 |
| 6,596,392 B1 | | 7/2003 | Tanaka et al. |
| 6,828,505 B1 | * | 12/2004 | Peruzzotti et al. ........ 174/110 R |
| 7,754,840 B2 | * | 7/2010 | Loveday et al. ............ 526/352 |
| 7,999,188 B2 | * | 8/2011 | Perego et al. ............. 174/120 R |
| 2003/0075707 A1 | | 4/2003 | Easter |
| 2008/0308296 A1 | * | 12/2008 | Smedberg et al. ...... 174/120 SR |
| 2009/0202828 A1 | * | 8/2009 | Pelizzoni et al. ............. 428/375 |
| 2011/0061893 A1 | * | 3/2011 | Smedberg et al. ...... 174/120 SR |

FOREIGN PATENT DOCUMENTS

| | | | |
|---|---|---|---|
| EP | 893802 | | 1/1999 |
| EP | 998747 | | 2/1999 |
| EP | 1 116244 | | 4/2000 |
| GB | 1372117 | | 10/1974 |
| JP | 52153188 | | 6/1976 |
| JP | 2001098124 A | * | 4/2001 |
| JP | 2005349686 A | * | 12/2005 |
| JP | 2010235706 | | 10/2010 |
| WO | WO 98/52197 | | 11/1988 |
| WO | WO 97/03124 | | 1/1997 |
| WO | WO 9703124 A1 | * | 1/1997 |
| WO | WO 00/39810 | | 7/2000 |
| WO | WO 2005041214 A1 | * | 5/2005 |

OTHER PUBLICATIONS

"Structure of Pluronic PEO PPO PEO Block Copolymer"; Meilleur et al., 1996.*

ELVAX 150 MSDS 2007.*

* cited by examiner

CABLE WITH ENVIRONMENTAL STRESS CRACKING RESISTANCE

FIELD OF THE INVENTION

The present invention relates to a cable with improved environmental stress cracking resistance.

More particularly, the present invention relates to a cable including at least one core comprising at least one transmissive element and at least one coating layer, said coating layer being made of a coating material comprising at least one polyethylene and at least one non-ionic surfactant including at least one poly(oxyalkylene) chain.

Moreover, the present invention also relates to a method for improving the environmental stress cracking resistance of a cable including at least one core comprising at least one transmissive element and at least one coating layer.

For the purposes of the present description and of the subsequent claims, the term "core" of a cable is used to indicate a semi-finished structure comprising a transmissive element, such as an electrical energy transmissive element, an optical signal transmissive element or an element which both transmits both electrical energy and optical signals, and at least one electrical isolation or, respectively, at least one containment element (such as, for example, a tube, a sheath, a microsheath or a grooved core), or at least two elements, one of which is an electrical isolation element and one is a containment element, arranged at a radially outer position with respect to the corresponding transmissive element.

For the purposes of the present description and of the subsequent claims, the term "electrical energy transmissive element" is used to indicate any element capable of transmitting electrical energy such as, for example, a metallic conductor element. As an illustrative example, if we consider a cable for transporting or distributing medium/high voltage electrical energy (where medium voltage indicates a voltage comprised between about 1 kV and about 30 kV, whereas high voltage indicates a voltage greater than about 30 kV), the "core" of the cable further comprises an inner semiconductive coating layer arranged at a radially outer position with respect to the conductor element, an outer semiconductive coating layer arranged at a radially outer position with respect to the electrical isolation element, a metallic screen arranged at a radially outer position with respect to said outer semiconductive coating layer, and an external sheathing layer arranged at a radially outer position with respect to said metallic screen.

For the purposes of the present description and of the subsequent claims, the term "optical signal transmissive element" is used to indicate any transmission element comprising at least one optical fibre. Therefore, such a term identifies both a single optical fibre and a plurality of optical fibres, optionally grouped together to form a bundle of optical fibres or arranged parallel to each other and coated with a common coating to form a ribbon of optical fibres. As an illustrative example, if we consider an optical cable the "core" of the cable further comprises a coating layer arranged at a radially outer position with respect to the grooved core, a tensile reinforcing layer at a radially outer position with respect to said outer coating layer, and an external sheathing layer arranged at a radially outer position with respect to said tensile reinforcing layer.

For the purposes of the present description and of the subsequent claims, the term "mixed electro-optical transmissive element" is used to indicate any element capable of transmitting both electrical energy and optical signals in accordance with the abovementioned definitions.

The present inventions also refers to cables provided with a plurality of cores as defined above, known in the field with the terms "bipolar cable", "tripolar cable" and "multipolar cable", depending on the number of cores incorporated therein (in the mentioned cases in number of two, three, or greater, respectively).

In accordance with the abovementioned definitions the present invention refers to cables provided with one or more cores of any type. In other words, the present invention refers to unipolar or multipolar cables, of electrical type for transporting or distributing electrical energy, or of the optical type comprising at least one optical fibre, or of the mixed energy/telecommunications type.

PRIOR ART

The use of polyethylene as coating material in cables industry has been already known from long time. However, use of polyethylene may present some drawbacks, in particular when cables are employed in stressed conditions such as, for example, when cables have to be pulled through conduits during installation. Usually, in order to facilitate the movement of the cable through these conduits, the polyethylene coating is lubricated with surface-active agents such as, for example, soaps, detergents, alcohols, polyglycol ethers, silicones and various other aliphatic and aromatic hydrocarbons. As the lubricated cables are stressed on being pulled through the conduits, the presence of the surface-active agents induce large, full depth cracks to form in the polyethylene coating so compromising the overall lifetime performances of the cables. Usually, said phenomenon in known as environmental stress cracking (ESC).

Some efforts have been already made in the art in order to improve the stress cracking resistance of polyethylene.

For example, U.S. Pat. No. 3,303,152 relates to a polyethylene composition comprising a major amount of polyethylene and a minor amount, at least 13% by weight but less than 50% by weight based on the total weight of the composition, of a paraffin wax having the following characteristics: a melting point of 122°-130° F., a penetration at 77° F. of 9-35 dmm, a viscosity at 210° F. of 36-45 S.U.S., and an oil content of less than 0.5% by weight based on the total weight of the composition. The abovementioned composition is said to have an improved stress cracking resistance (ESCR).

U.S. Pat. No. 3,422,055 relates to a composition comprising a homogeneous blend of a polyolefin resin containing more than 50% by weight ethylene and from 1% to 15% by weight of the polyolefin resin of a solid polymer of ethylene and vinyl acetate, said polymer of ethylene and vinyl acetate having a melt index of about 12 dg/min and a mole ratio of ethylene to vinyl acetate of about 7 to 1. Use of said composition as a wire coating is also disclosed. The abovementioned composition is said to have improved environmental stress cracking resistance.

GB Patent 1,372,117 relates to a polyethylene molding composition comprising high density polyethylene having a melt flow index (MFI) value of from 0.1 to 10 and minor amount by weight of an additive, which is a terminally modified polyether having the following general formula:

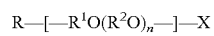

wherein R is a non-aromatic hydrocarbyl group which is preferably an alkyl, alkenyl, or cycloalkyl radical; $R^2O$ is a polyether chain unit wherein $R^2$ is a divalent hydrocarbon group, preferably an alkylene radical which is optionally substituted by an alkyl, aryl, cycloalkyl or aralkyl group; n is an integer in the range from 1 to 100; $R^1$ is (a) a divalent non-aromatic hydrocarbon radical, in which case R and $R^1$ together form a single hydrocarbyl group having from 5 to 30 carbon atoms, (b) an arylene or aralkylene radical, in which case the two groups R and $R^1$ together contain up to 30 carbon atoms or (c) an alkylene radical substituted by an aryl, aralkyl or cycloalkyl group; and X is a group selected from —$CH_2COOH$, —$CH_2CHO$, —$CH_2CN$, —$CH_2CH_2OH$, —$CH_2COOM$, —$CH_2COOR^0$, in which M is a monovalent metal ion and $R^0$ is a hydrocarbyl radical, preferably an alkyl, alkenyl or cycloalkyl radical. A molded article formed from said polyethylene molding composition is also disclosed. The abovementioned polyethylene molding composition is said to have a good environmental stress cracking resistance.

International Patent Application WO 97/03124 relates to a cable sheathing composition consisting of a multimodal olefin polymer mixture having a density of about 0.915-0.955 g/cm³ and a melt flow rate of about 0.1-0.3 g/10 min, said olefin polymer mixture comprising at least a first and a second olefin polymer, of which the first has a density and a melt flow rate selected from (a) about 0.930-0.975 g/cm³ and about 50-2000 g/10 min and (b) about 0.880-0.930 g/cm³ and about 0.1-0.8 g/10 min. The use of said composition as outer sheath for a power or communication cable is also disclosed. The abovementioned composition is said to have an improved environmental stress cracking resistance and a reduced shrinkage at a given processability.

U.S. Pat. No. 6,596,392 relates to a sheathed wire or cable obtained by coating an outermost layer of a wire or a cable with a polyethylene resin (A) prepared from the copolymer produced by polymerization using a single-site catalyst, wherein high-pressure low density polyethylene (B) having a melt flow rate (MFR, ASTM D1238, 190° C., load: 2.16 kg) of 0.05 to 20 g/10 min, is contained in the polyethylene resin (A) in an amount of not more than 50% by weight. The abovementioned sheathed wire or cable is said to have excellent stress cracking resistance, abrasion resistance and low-temperature impact resistance.

U.S. Pat. No. 4,312,918 relates to a polyethylene composition based on low density, high molecular weight polyethylene in admixture with a copolymer of ethylene-alkyl acrylate having a melt index of about 3 to about 24, wherein the combined alkyl acrylate content is about 16% by weight to about 25% by weight and the copolymer is present in the composition in an amount sufficient to pass U.S. industry standards for stress cracking resistance, generally on the order of about 6% by weight to about 25% by weight based on the combined weight of the polyethylene and the copolymer. The abovementioned composition is said to have an improved environmental stress cracking resistance and to be particularly useful as jacketing for telephone wires and cables.

Moreover, European Patent EP 814,485 relates to an improved electric insulation composition comprising a polymer and an additive that reduces water treeing due to electrical aging in water. Preferably, said additive is selected from ethylenoxy-propylenoxy copolymers.

SUMMARY OF THE INVENTION

The Applicant has now found that it is possible to improve the environmental stress cracking resistance (ESCR) of a polyethylene composition by adding, to the same, at least one non-ionic surfactant including at least one poly(oxalkylene) chain, said chain being a chain of randomly distributed oxyalkylene groups, or a chain having alternating blocks or backbone segments or repeating oxyalkylene groups. The obtained polyethylene composition may be advantageously used in the manufacturing of a coating layer of a cable, preferably of a cable external sheathing layer, said cable external sheathing layer preferably having a protective function. Moreover the addition of said non-ionic surfactant does not negatively affect the mechanical properties (in particular, stress at break and elongation at break) of the obtained coating layer. In addition, also the hardness of said coating layer is not negatively affected.

In a first aspect, the present invention thus relates to a cable including at least one core comprising at least one transmissive element and at least one coating layer made of a coating material, wherein said coating material comprises:
- at least one polyethylene;
- at least one non-ionic surfactant having the following general formula (I):

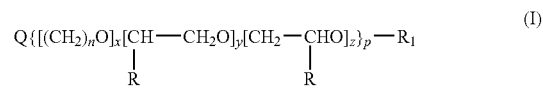

wherein:
  Q is a p-functional group;
  R is a linear or branched $C_1$-$C_4$ alkyl group, preferably a methyl group;
  $R_1$ is a hydrogen atom or a linear or branched $C_1$-$C_6$ alkyl group, preferably a hydrogen atom;
  n is an integer from 2 to 5 inclusive, preferably 2;
  x is an integer from 5 to 500 inclusive, preferably from 10 to 300 inclusive;
  y is an integer from 0 to 500 inclusive, preferably from 10 to 300 inclusive;
  z is an integer from 0 to 500 inclusive, preferably from 10 to 300 inclusive;
  y+z is not lower than 2;
  p is an integer from 1 to 4 inclusive, preferably 1 or 4;
provided that, when the transmissive element is an electrical energy transmissive element said at least one coating layer is an external sheathing layer.

Preferably, Q is a group selected from:
  $OR_2$ groups wherein $R_2$ is a hydrogen atom, a linear or branched $C_1$-$C_4$ alkyl group, or a blend of a linear or branched $C_{13}$-$C_{15}$ alkyl groups, preferably a hydrogen atom;
  groups having the following structure:

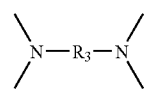

wherein $R_3$ is a linear or branched $C_2$-$C_6$ allene group, preferably an ethylene group.

Preferably, said coating layer is a cable coating layer having a protective function (e.g., the coating layer is able to prevent the damages of the transmission element due to mechanical stresses during manufacturing, installation and use). More preferably, said coating layer is an external sheathing layer having a protective function.

According to one embodiment, said external sheathing layer may comprise two layers: an inner layer made of a coating material above reported and an outer layer usually comprising a thermoplastic material such as, for example, flexible polyvinylchloride (PVC), uncross-linked polyethylene, in particular, medium density polyethylene (MDPE), or uncross-linked homopolymer or copolymer of propylene.

Alternatively, said outer layer may have self-extinguishing properties and may be made of a flame-retardant composition comprising:
- at least one polymer selected, for example, from: polyolefins, various olefin copolymers, copolymers of olefins with ethylenically unsaturated esters, polyesters, polyethers, polyether/polyester copolymers, or mixtures thereof;
- at least one inorganic filler selected, for example, from: hydroxides, hydrated oxides, salts or hydrated salts of metals, in particular of calcium, aluminum or magnesium, such as: magnesium hydroxide, alumina trihydrate, hydrated magnesium carbonate, magnesium carbonate, hydrated calcium and magnesium carbonate, calcium and magnesium carbonate, or mixtures thereof, and, optionally,
- at least one coupling agent selected, for example, from: silane compounds containing at least one ethylenic unsaturation; epoxides containing an ethylenic unsaturation; monocarboxylic acids or, preferably, dicarboxylic acids having at least one ethylenic unsaturation, or derivatives thereof, in particular anhydrides or esters, or mixtures thereof.

More details about the above reported flame-retardant composition may be found, for example, in U.S. Pat. Nos. 6,162,548 and 6,495,760, in European patents EP 998,747, 893,802, 1,116,244 and in International Patent Application WO 00/39810.

According to one preferred embodiment, said coating material further comprises at least one copolymers of ethylene with at least one ethylenically unsaturated ester.

According to one preferred embodiment, said coating material may further comprise a carbon black.

According to a further aspect, the present invention also relates to a method for improving environmental stress cracking resistance of a cable including at least one core comprising at least one transmissive element and at least one coating layer made of a coating material comprising at least one polyethylene, said method being characterized by the addition of at least one non-ionic surfactant having general formula (I) which is defined as disclosed above.

According to a further aspect, the present invention relates to the use of a composition comprising:
- at least one polyethylene,
- at least one non-ionic surfactant having general formula (I) which is defined as disclosed above;
to improve environmental stress cracking resistance of a cable coating layer.

According to one preferred embodiment, the polyethylene (PE) is an ethylene homopolymer or a copolymer of ethylene with at least one α-olefin having a density of between 0.860 g/cm$^3$ and 0.970 g/cm$^3$, preferably between 0.910 g/cm$^3$ and 0.960 g/cm$^3$.

For the purposes of the present description and of the subsequent claims, the term "α-olefin" means an olefin of general formula $CH_2$=CH—R' in which R' represents a linear or branched alkyl group containing from 1 to 10 carbon atoms. The α-olefin may be selected, for example, from: propylene, 1-butene, 1-pentene, 4-methyl-1-pentene, 1-hexene, 1-octene, 1-dodecene, or mixtures thereof. The following are preferred: 1-butene, 1-hexene and 1-octene. The amount of α-olefin optionally present is generally between 0.5 mol % and 15 mol %, preferably between 1 mol % and 10 mol %.

The polyethylene is preferably selected from: high density polyethylene (HDPE) having a density of at least 0.940 g/cm$^3$, preferably of between 0.940 g/cm$^3$ and 0.960 g/cm$^3$; medium density polyethylene MDPE) having a density of between 0.926 g/cm$^3$ and 0.940 g/cm$^3$; low density polyethylene (LDPE) and linear low density polyethylene (LLDPE) having a density of between 0.910 g/cm$^3$ and 0.926 g/cm$^3$.

According to one preferred embodiment said polyethylene is present in the coating material in an amount of between 80% by weight and 99% by weight, preferably of between 85% by weight and 95% by weight, with respect to the total weight of the coating material.

According to a further preferred embodiment, said polyethylene is obtained from a waste material.

For the purposes of the present description and of the claims which follow, the term "waste material" means both the industrial wastes and the end-of-life products.

Preferably, said polyethylene obtained from a waste material has a density not higher than 0.970 g/cm$^3$, preferably not lower than 0.910 g/cm$^3$, more preferably of between 0.915 g/cm$^3$ and 0.955 g/cm$^3$, and a Melt Flow Index (MFI), measured at 190° C. with a load of 2.16 Kg according to ASTM D1238-00 standard, of between 0.01 g/10' and 2 g/10', preferably of between 0.05 g/10' and 1 g/10'.

Preferably, said polyethylene obtained from a waste material has a melting point lower than 150° C., preferably of between 100° C. and 140° C.

Preferably, said polyethylene obtained from a waste material has a melting enthalpy ($\Delta H_m$) of between 50 J/g and 150 J/g, preferably of between 80 J/g and 140 J/g.

Said melting enthalpy (ASH) may be determined by Differential Scanning Calorimetry with a scanning rate of 10° C./min: further details regarding the analysis method will be described in the examples given hereinbelow.

Said polyethylene obtained from a waste material may further comprise a carbon black. Generally, said carbon black may be present in the polyethylene in an amount higher than 2.0% by weight, preferably of between 2.5% by weight and 4.0% by weight, with respect to the total weight of the polyethylene.

Preferably, said polyethylene obtained from a waste material may be selected from low density polyethylene (DPE), linear low density polyethylene (LLDPE), very low density polyethylene (VLDPE), or mixtures thereof. Mixtures of low density polyethylene with a small amount of linear low density polyethylene, preferably an amount not higher than 15% by weight with respect to the total weight of said polyethylene, are particularly preferred.

According to one preferred embodiment, said polyethylene obtained from a waste material is present in the coating material in an amount of between 30% by weight and 90% by weight, preferably of between 40% by weight and 60% by weight, with respect to the total weight of the coating material.

Examples of said polyethylene obtained from a waste material which may be used according to the present invention and which are currently commercially available are the products coming from used agricultural polyethylene films (e.g. the products Alfaten® from Alfagran).

According to one preferred embodiment, said polyethylene obtained from a waste material is used in a mixture with a second polyethylene having a density higher than 0.940 g/cm$^3$, preferably not higher than 0.970 g/cm$^3$, more preferably of between 0.942 g/cm$^3$ and 0.965 g/cm$^3$.

Preferably, said second polyethylene has a Melt Flow Index NF), measured at 190° C. with a load of 2.16 Kg according to ASTM D1238-00 standard, of between 0.05 g/10' and 2 g/10', preferably of between 0.1 g/10' and 1 g/10'.

Preferably, said second polyethylene has a melting point higher than 120° C., preferably of between 125° C. and 165° C.

Preferably, said second polyethylene has a melting enthalpy ($\Delta H_m$) of between 125 J/g and 200 J/g, preferably of between 130 J/g and 185 J/g.

Said melting enthalpy ($\Delta H_m$) may be determined by Differential Scanning Calorimetry as disclosed above.

Preferably, said second polyethylene is a polyethylene obtained from waste material. Optionally, said polyethylene obtained from waste material comprises a small amount of polypropylene, preferably an amount not higher than 15% by weight with respect to the total weight of the polyethylene.

According to one preferred embodiment, said second polyethylene is present in the coating material in an amount of between 10% by weight and 70% by weight, preferably of between 40% by weight and 60% by weight, with respect to the total weight of the coating material.

Examples of said second polyethylene which may be used according to the present invention and which are currently commercially available are the products DGDK-3364® Natural from Dow Chemical, or the products coming from used polyethylene bottles (e.g. from Breplast).

Usually, the polyethylene obtained from a waste material, may be obtained as a product in subdivided form, in particular in form of flakes having an average diameter generally of between about 0.1 cm and about 2.0 cm, or in form of granules having an average diameter generally of between about 0.5 mm and about 5.0 mm, by means of processes known in the art. For example, said product in a subdivided form may be obtained by means of a process comprising the following steps:

(a) sorting out the impurities (such as, for example, metal, paper, etc.) optionally present in a waste material (for example, by feeding said waste material to a conveyor belt and manually sorting out the impurities);

(b) feeding the waste material obtained in step (a) [(for example, by means of the same conveyor belt used in step (a)], to a mill obtaining flakes having an average diameter generally of between about 0.1 cm and about 2.0 cm;

(c) washing the flakes obtained in step (b) in water and filtering the same in order to discard the impurities having a density higher than 1 kg/l;

(d) drying the flakes obtained in step (c) (for example, in a drying apparatus) with warm and dry air; and, optionally, (e) densifying the dried flakes obtained in step (d) (for example, by means of a compacting press or of an agglomerator).

Alternatively, the flakes obtained in step (d) may be submitted to the following additional steps:

(f) feeding the dried flakes obtained in step (d) to an extruding apparatus comprising a housing and at least one screw rotatably mounted into said housing, including at least a feed hopper and a discharge opening;

(g) melting and mixing said flakes obtaining a homogeneous mixture;

(h) filtering and granulating the homogeneous mixture obtained in step (g) obtaining a product in form of granules having an average diameter generally of between about 0.5 mm and about 5.0 mm;

(i) cooling the product in form of granules obtained in step (h) (for example, in water);

(j) drying the cooled product obtained in step (i) (for example, in a drying apparatus) with warm and dry air.

Preferably, the homogeneous mixtures obtained in step (g) is fed to a second extruding apparatus to obtain a more homogeneous mixture.

Preferably, said extruding apparatuses are single-screw extruders.

Preferably, the granulation in step (h) may be carried out, by means of chopping or shredding the homogeneous mixture obtained in step (g) by means of cutting devices known in the art.

As already reported above, said coating material may further comprises at least one copolymer of ethylene with at least one ethylenically unsaturated ester.

Preferably, said copolymer of ethylene with at least one ethylenically unsaturated ester may be selected, for example, from: alkyl acrylates, alkyl methacrylates or vinyl carboxylates, wherein the alkyl group, linear or branched, may have from 1 to 8, preferably from 1 to 4, carbon atoms, while the carboxylate group, linear or branched, may have from 2 to 8, preferably from 2 to 5, carbon atoms; and wherein the ethylenically unsaturated ester is generally present in an amount of from 0.1% by weight to 80% by weight, preferably from 0.5% by weight to 50% by weight, with respect to the total weight of the copolymer.

Examples of copolymers of ethylene with at least one ethylenically unsaturated ester which may be used in the present invention are: ethylene/vinylacetate copolymer (EVA), ethylene/ethylacrylate copolymer (EEA), ethylene/butylacrylate copolymer (EBA), or mixtures thereof. Ethylene/vinylacetate copolymer (EVA) is particularly preferred.

According to one preferred embodiment, said copolymer of ethylene with at least one ethylenically unsaturated ester is present in the coating material in an amount of between 1.0% by weight and 10% by weight, preferably of between 2.0% by weight and 6.0% by weight, with respect to the total weight of the coating material.

According to one preferred embodiment, said non-ionic surfactant having general formula (I) may be liquid or solid at room temperature and may have an average molecular weight higher than 400, preferably of from 600 to 20,000, more preferably of from 1,000 to 15,000.

Said molecular weight may be determined by known techniques such as, for example, by gel permeation chromatography (GPC).

According to one preferred embodiment, said non-ionic surfactant having general formula (I) is selected from ethylene oxide/propylene oxide block copolymers having the following formulae (Ia) and (Ib):

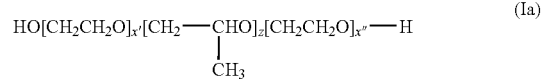

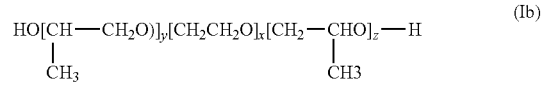

wherein x'+x"=x and x, y and z have the same meanings above reported.

Preferably, said ethylene oxide/propylene oxide block copolymers having formula (Ia) or (Ib) have an ethylene oxide content of from 50% by weight to 90% by weight, preferably of from 60% by weight to 80% by weight, with respect to the total weight of the ethylene oxide/propylene oxide block copolymers.

Examples of ethylene oxide/propylene oxide block copolymers which may be used according to the present invention and which are currently commercially available are the products Pluronic® PE and RPE from Basf or Synperonic® LF/RA from ICI.

According to a further preferred embodiment the non-ionic surfactant having general formula (I) is selected from ethylene diamine alkoxylates having the following general formula (Ic)

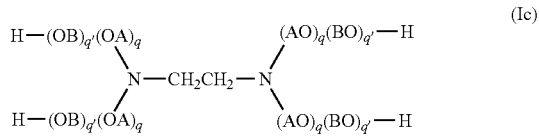

(Ic)

wherein A is propylene and B is ethylene, q is an integer from 1 to 30 inclusive, preferably from 4 to 25 inclusive and q' is an integer from 1 to 150 inclusive, preferably from 4 to 120 inclusive.

Examples of non-ionic surfactants of formula (Ib) which may be used according to the present invention and which are currently commercially available are the products Synperonic® T from ICI.

The non-ionic surfactants above reported may be prepared according to processes known in the art as described, for example, in U.S. Pat. No. 2,674,619 or 3,036,118.

According to one preferred embodiment, the non-ionic surfactant is present in the coating material in an amount of between 0.01% by weight and 3.0% by weight, preferably of between 0.1% by weight and 1.0% by weight, with respect to the total weight of the coating material. Said non-ionic surfactant may be added to the coating material as such or as a masterbatch in homopolymers or copolymers of ethylene with at least one ethylenically unsaturated ester which may be selected from those above reported. Said masterbatch may further comprise other conventional additives which will be specifically disclosed hereinbelow.

In order to protect the coating material from UV degradation said coating materials as reported above, may further comprise carbon black. Preferably, the carbon black is added to the coating material in an amount of between 2.0% by weight and 5.0% by weight preferably of between 2.5% by weight and 4.0% by weight, with respect to the total weight of the coating material. The carbon black may be added to the coating material as such or as a masterbatch in polyethylene. Masterbatch is particularly preferred.

Other conventional additives may be added to the coating material according to the present invention such as, for example antioxidants, processing aids, lubricants, pigments, foaming agents, plasticizers, UV stabilizers, flame-retardants, fillers, thermal stabilizers, or mixtures thereof.

Conventional antioxidants suitable for the purpose may be selected from antioxidants of aminic or phenolic type such as, for example: polymerized triethyl-dihydroquinoline (for example poly-2,2,4-trimethyl-1,2-dihydroquinoline); 4,4'-thiobis(3-methyl-6-t-butyl)-phenol; pentaerythryl-tetra[3-(3,5-di-t-butyl-4-hydroxyphenyl)propionate]; 2,2'-thiodiethylene-bis[3-(3,5-di-t-butyl-4-hydroxyphenyl)propionate], or the mixtures thereof.

Conventional processing aids suitable for the purpose may be selected, for example, from: calcium stearate, zinc stearate, stearic acid, paraffin wax, or mixtures thereof.

Conventional fillers suitable for the purpose may be selected, for example, from glass particles, glass fibers, calcinated clay, talc, or mixtures thereof.

The cable according to the present invention may be made by known techniques for the deposition of layers of polymeric material such as, for example, by extrusion. Advantageously, extrusion is effected in a single pass, for example, by a "tandem" technique, in which individual extruders are used, arranged in series, or by co-extrusion with a multiple extrusion head.

BRIEF DESCRIPTION OF THE DRAWINGS

Further details will be illustrated in the following, appended drawings, in which.

DETAILED DESCRIPTION OF THE PREFERRED EMBODIMENTS

Figure 1:
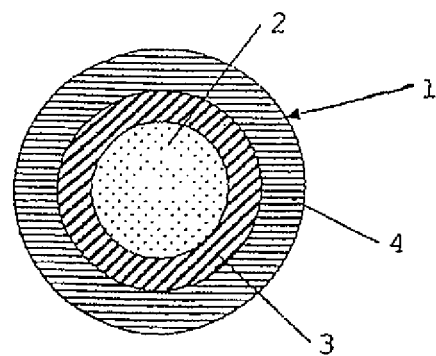
FIG. 1 shows, in cross-section, an electrical cable of the unipolar type according to one embodiment of the present invention.

Referring to FIG. 1, cable 1 comprises a conductor 2, an internal insulating coating layer 3 and an external sheathing layer 4 which may be made according to the present invention.

Figure 2:
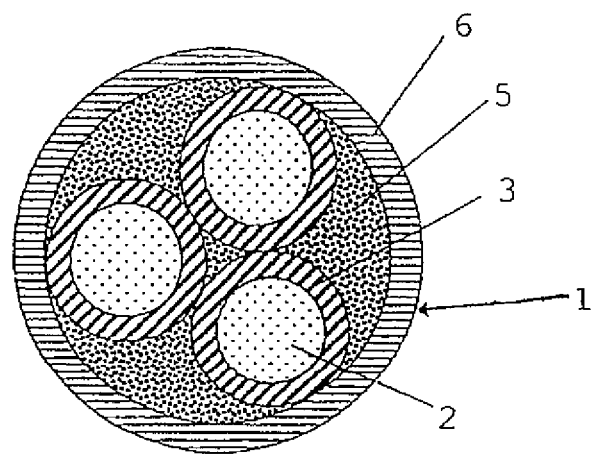
FIG. 2 shows, in cross-section, an electrical cable of the tripolar type according to a further embodiment of the present invention.

Referring to FIG. 2, cable 1 comprises three conductors 2, each one covered by an insulating coating layer 3. The conductors 2 thus insulated are wound around one another and the interstices between the insulated conductors 2 are filled with a filler material that forms a continuous structure having a substantially cylindrical shape. The filler material 5 is preferably a flame-retarding material. An external sheathing layer 6, which may be made according to the present invention, is applied, generally by extrusion, to the structure thus obtained.

Figure 3:
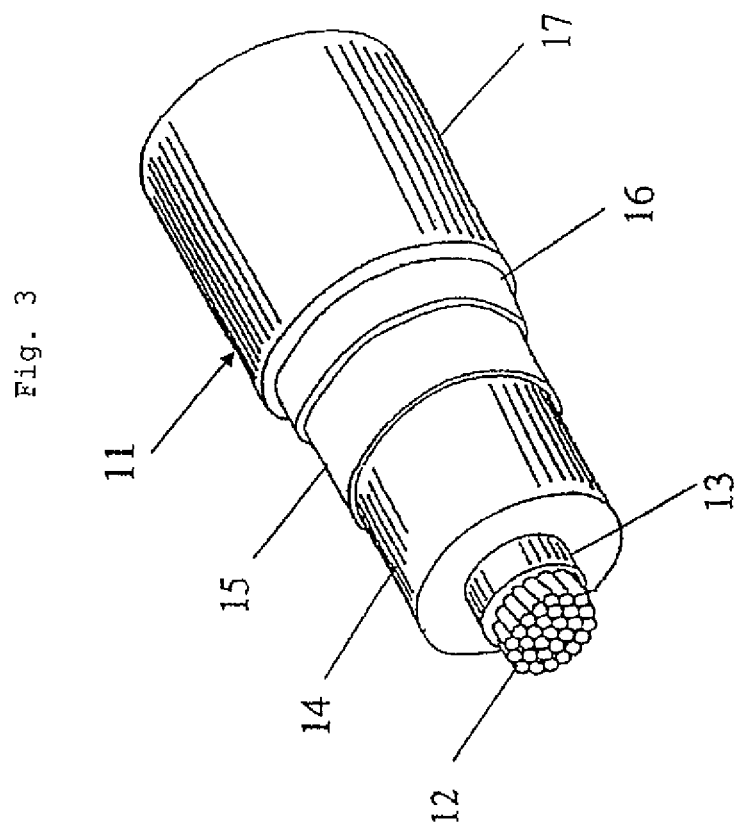
FIG. 3 shows, in perspective view, a length of cable with parts removed in stages, to reveal its structure according to a further embodiment of the present invention.

Referring to FIG. 3, cable 11 comprises, in order from the centre outwards: a conductor 12, an internal semiconducting layer 13, an insulating coating layer 14, an external semiconducting layer 15, a metallic screen 16, and an external sheathing layer 17.

The conductor 12 generally consists of metal wires, preferably of copper or aluminum, stranded together according to conventional techniques. The internal and external semiconducting layers 13 and 15 are extruded on the conductor 12, separately or simultaneously with the insulating coating layer 14. A screen 16, generally consisting of electrically conducting wires or tapes wound spirally, is usually arranged around the external semiconducting layer 15. Said screen is then covered with an external sheathing layer 17, which may be made according to the present invention.

Figure 4:
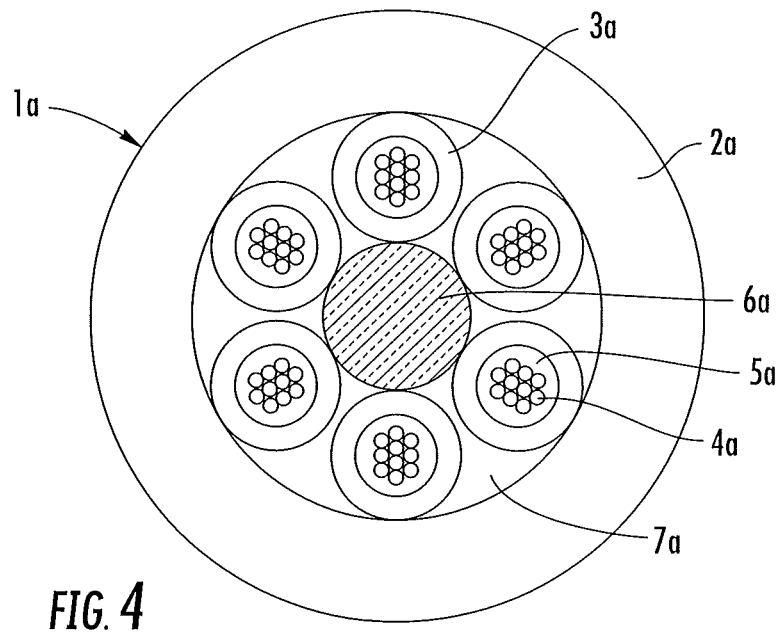
FIG. 4, shows, in cross-section, an optical cable according to a further embodiment of the present invention.

The cable may in addition be provided with an outer protective structure (not shown in FIG. 3), which mainly performs the function of mechanical protection of the cable against impact and/or compression. Said protective structure may be, for example, a metallic armor or a layer of expanded polymeric material as described, for example, in International Patent Application WO 98/52197:

FIG. 4 is a sectional view of an optical cable 1a consisting of an external sheathing layer 2a which may be made according to the present invention, a certain number of tubes 3a of polymeric material within which are housed the optical fibres 4a, normally embedded in a packing material 5a which has the purpose of preventing the longitudinal propagation of water in case of accidental rapture; the tubes containing the optical fibres are wound around a central support 6a normally made of glass-fiber reinforced plastic and capable of limiting the thermal contractions of the cable (the stranding may be of the continuous or alternate type, commonly called S-Z). Optionally, there may be inserted between the external sheathing layer 2a and the tubes 3a an interstitial packing material 7a capable of penetrating into the interstices between the tubes and the coating, between one tube and the next, and between the tubes and the support, in order to limit the longitudinal propagation of water inside the cable.

Figure 5:
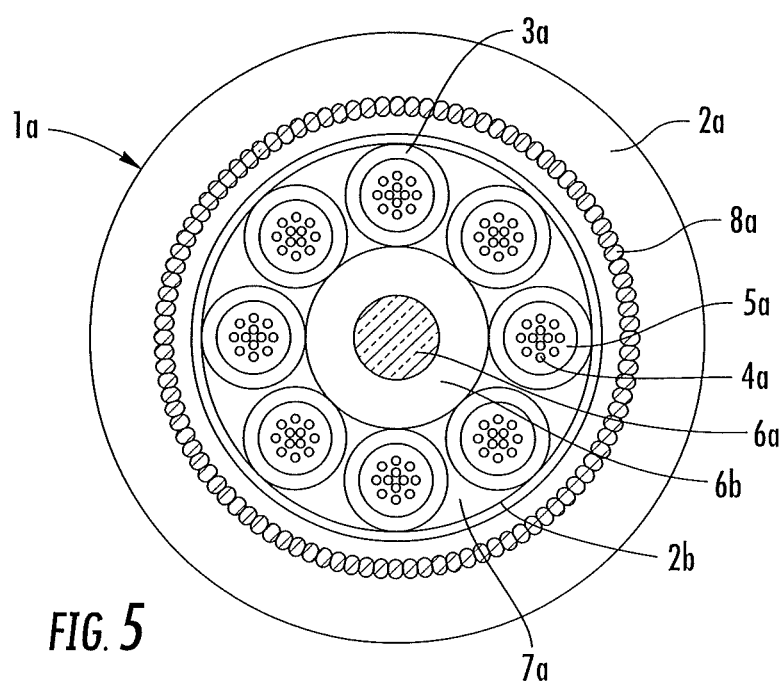
FIG. 5, shows, in cross-section, an optical cable according to a further embodiment of the present invention.

FIG. 5 is a sectional view of an optical cable similar to that described in FIG. 4, with the difference that inside the external sheathing layer 2a there is a tensile reinforcing layer 8a (for example a glass fiber or a polyaramide fiber such as the product known commercially as Kevlar®); additionally, the tubes 3a containing the optical fibres are surrounded by a sheath of a polymeric material 2b having one or more layers, which may be made according to the present invention. Additionally, according to the embodiment shown in FIG. 5, the central support comprises a core 6a, made for example of glass-fiber reinforced plastic or similar materials, capable of limiting the thermal contractions of the cable, and a coating 6b, made for example of a polymeric material, such that it increases the diameter of the core to a value capable of receiving the desired number of tubes wound around it.

Figure 6:
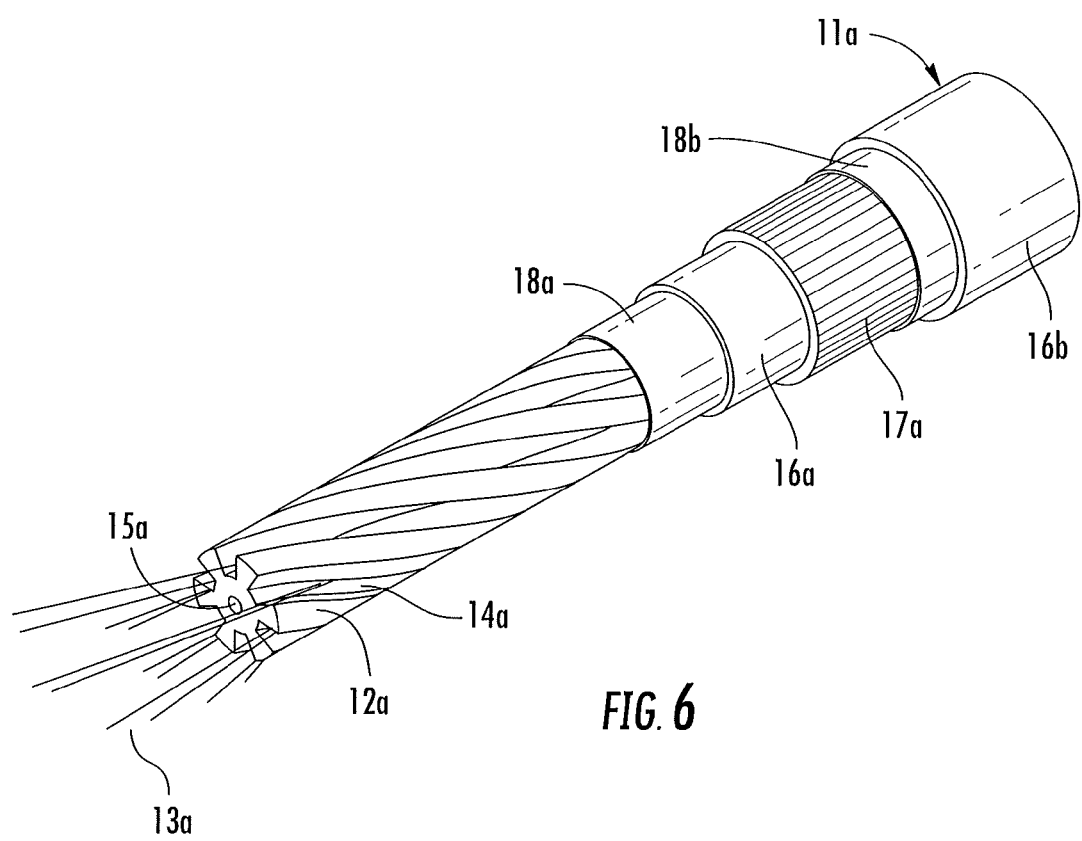
FIG. 6 shows, in perspective view, a length of an optical cable with parts removed in stages, to reveal its structure according to a further embodiment of the present invention.

FIG. 6 is a perspective view of an optical cable 11a according to the present invention in which the optical fibres 13a are located in housings in a central grooved core 12a made of a polymeric material, which if necessary may be in contact with a suitable packing 14a; the grooved core may optionally contain a central support made of glass-fiber reinforced plastic 15a. The grooved core is therefore surrounded by a set of layers (16a, 16b) at least one of which may be made according to the present invention, and by a tensile reinforcing layer 17a which as been described above; optionally, the cable structure may also comprise a tape for the purposes of containment and/or protection of the fibers 18a and a wet-expanding tape 18b (for example a polyester or polyamide tape filled with wet-expanding material, such as sodium polyacrylate) for the purpose of limiting the longitudinal propagation of water inside the cable.

FIGS. 1, 2, 3, 4, 5 and 6 show just some possible embodiments of a cable according to the present invention.

Although the present invention has been illustrated in relation to a cable, other articles may be produced by molding or extruding a coating material according to the invention such as, for example, pipes, tubes, plaques, sheets, and other articles useful as house wares.

The present invention is further described in the following examples, which are merely for illustration and must not be regarded in any way as limiting the invention.

EXAMPLES 1-9

Preparation of the Coating Materials

Table 1 shows the characterization of the components used in the examples.

The components were the following:
recycled PE: flakes or granules comprising a mixture of 90% by weight of low density polyethylene, 10% by weight of linear low density polyethylene, and 2.5% by weight of carbon black, coming from used agricultural films;
recycled HDPE: flakes or granules of high density polyethylene comprising 10% by weight of isotactic polypropylene coming from used bottles (Breplast).

The Melt Flow Index (I) was measured at 190° C. with a load of 2.16 Kg according to ASTM D1238-00 standard.

The density was measured, at 23° C., according to CEI EN 60811-1-3 standard.

The melting point and the melting enthalpy ($\Delta H_m$) were measured by Mettler DSC instrumentation (second melting value) with a scanning rate of 10° C./min (instrument head type DCS 30; microprocessor type PC 11, Mettler software Graphware TA72AT.1).

The carbon black content was determined by Mettler TGA instrumentation using the following method:
heating from 20° C. to 850° C. at a scanning rate of 20° C./min in $N_2$ (60 ml/min);
leaving at 850° C. for 1 min in $N_2$ (60 ml/min);
leaving at 850° C. for 10 min in air (60 ml/min).

The obtained data are given in Table 1.

TABLE 1

| COMPONENT | MFI | Density (g/cm³) | Melting point (° C.) | Melting enthalpy (J/g) | Carbon black (%) |
|---|---|---|---|---|---|
| Recycled PE | 0.45 | 0.920 | 121 | 110 | 2.5 |
| Recycled HDPE | 0.21 | 0.960 | 131 | 156 | — |

The masterbatches (MB) given in Table 2 (the amounts of the various components are expressed in % by weight with respect to the total weight of the masterbatch) were prepared by mixing all the components in a twin-screw extruder in 40/42 D configuration, with rotary speed of about 350 rev/min, the temperature of the extrusion head was 200° C.

TABLE 2

|  | MB 1 | MB 2 | MB 3 | MB 4 |
|---|---|---|---|---|
| Escorene ® UL 02020 | 50.0 | 44.0 | — | 64.5 |
| Escorene ® LD 100MED | — | — | 24.0 | — |
| Corax ® N 550 | 30.0 | 30.0 | 50.0 | 19.0 |
| Anox ® HB | 20.0 | 20.0 | 20.0 | 12.5 |
| Pluronic ® PE 6800 | — | 6.0 | 6.0 | 4.0 |

Escorene® UL02020: ethylene/vinyl acetate copolymer containing 20% by weight of vinylacetate with respect to the total weight of the copolymer (Exxon Mobil);

Escorene® LD 100MED: low-density polyethylene (density: 0.9225 g/cm³) Exxon Mobil);

Corax® N 550: carbon black Degussa);

Anox® HB:2,2,4-trimethyl-1,2-dihydroquinoline polymer (Great Lakes Chemical);

Pluronic® PE 6800: ethylene oxide/propylene oxide block copolymer containing 80% by weight of ethylene oxide with respect to the total weight of the block copolymer (ethylene oxyde/propylene oxide ratio 80/20) and an average molecular weight of about 8500 (Basf).

Production of Flakes or Granules of Recycled PE

Used agricultural films were fed to a conveyor belt and the impurities present (metal, paper, etc.) were manually sorted out. Subsequently, the films were fed, by means of the same conveyor belt, to a mill obtaining flakes having an average diameter generally of between about 0.1 cm and about 2.0 cm.

The obtained flakes were washed in water and subsequently filtered in order to discard the impurities having a density higher than 1 kg/l. The flakes were subsequently dried in a drying apparatus with warm and dry air.

Alternatively, the obtained flakes were fed to a first single-screw extruder in 32 D configuration, with rotary speed of about 60 rev/min, the temperature of the extrusion head was 220° C. The obtained melted mass was filtered through a filter associated with said first single-screw extruder and subsequently fed to a second single-screw extruder in 32 D configuration, with rotary speed of about 100 rev/min, the temperature of the extrusion head was 200° C. The obtained melted mass was filtered through a filter associated with said second single-screw extruder and subsequently granulated with a cutting device having a rotatory blades obtaining granules having an average diameter of about 4 mm.

The obtained granules were then cooled in water and dried in a drying apparatus with warn and dry air.

Production of Flakes or Granules of Recycled HDPE

Used HDPE bottles were cut by feeding the same to a mill obtaining flakes having an average diameter generally of between about 0.1 cm and about 2.0 cm.

The obtained flakes were washed in water and subsequently filtered in order to discard the impurities having a density higher than 1 kg/l. The flakes were subsequently dried in a drying apparatus with warm and dry air.

Alternatively, the obtained flakes were fed to a single-screw extruder in 32 D configuration, with rotary speed of about 60 rev/min the temperature of the extrusion head was 220° C. The obtained melted mass was filtered through a filter associated with said single-screw extruder and subsequently granulated with a cutting device having a rotatory blades obtaining granules having an average diameter of about 4 mm.

The obtained granules were then cooled in water and dried in a drying apparatus with warm and dry air.

the mixing was carried out at a temperature of 185° C., at a rotor speed of about 65 rev/mill, in order to obtain an homogeneous mixture. The obtained mixture left the double-screw mixer in the form of "spaghetti" which were cooled in water, dried in a drying apparatus with warm and dry air and subsequently granulated with a cutting device having a rotatory blades obtaining granules having an average diameter of about 4 mm.

TABLE 3

| EXAMPLE | 1(*) | 2(*) | 3(*) | 4 | 5(*) | 6 | 7 | 8 | 9(*) |
|---|---|---|---|---|---|---|---|---|---|
| Recycled PE (granules) | 45.0 | 44.7 | 40.0 | 44.7 | 44.5 | 44.2 | 42.0 | — | — |
| Recycled HDPE (granules) | 50.0 | 50.0 | 50.0 | 50.0 | 50.0 | 50.0 | 50.0 | — | — |
| Recycled PE (flakes) | — | — | — | — | — | — | — | 40.0 | 39.0 |
| Recycled HDPE (flakes) | — | — | — | — | — | — | — | 55.0 | 55.0 |
| Vibatan ® PE Black 99415 | 4.0 | 4.0 | 4.0 | 4.0 | — | — | — | — | 5.0 |
| Anox ® HB | 1.0 | 1.0 | 1.0 | 1.0 | — | — | — | — | 1.0 |
| Escorene ® UL02020 | — | — | 5.0 | — | — | — | — | — | — |
| MB 1 | — | — | — | — | 5.0 | — | — | — | — |
| MB 2 | — | — | — | — | — | 5.0 | — | — | — |
| MB 3 | — | — | — | — | — | — | — | 5.0 | — |
| MB 4 | — | — | — | — | — | — | 8.0 | — | — |
| Pluronic ® PE 6800 | — | — | — | 0.3 | — | — | — | — | — |
| Igepal ® CO 630 | — | 0.3 | — | — | — | — | — | — | — |

(*)comparative.

Vibatan® PE Black 99415: 40% dispersion of carbon black in low density polyethylene (VBA Group);

Igepal® CO 630: nonylphenoxy polyethyleneoxide (Gaf Corp.).

The obtained granules were subjected to the following analysis.

Environmental Stress Crack Resistance (ESCR)

The ESCR was determined according to D-1693 standard, Cond. A.

For this purpose, plates with thickness of 2 mm and cut thickness of 0.3 mm were prepared by compression molding at the following conditions:

heating at 190° C. under 20 bar pressure and maintaining at these conditions for 15 min;

cooling at 145° C. under 20 bar pressure and maintaining at these conditions for 1 hour;

cooling at room temperature under 20 bar pressure.

The measurement was carried out at a temperature of 50° C. in the presence of 10% Igepal solution. The obtained data are given in Table 4.

Hardness

The Shore D hardness was determined according to ASTM D2240-03 standard.

For this purpose, plates with thickness of 8 mm were prepared by compression molding at 190° C. under 20 bar pressure after preheating for 10 min at the same temperature. The obtained data are given in Table 4.

TABLE 4

| EXAMPLE | 1(*) | 2(*) | 3(*) | 4 | 5(*) | 6 | 7 | 8 | 9(*) |
|---|---|---|---|---|---|---|---|---|---|
| ESCR(hours) | <100 | <72 | 800 | >1000 | 400 | >1000 | >1000 | >1000 | <192 |
| Shore D | 58.5 | 58.0 | 57.5 | 58.5 | 57.0 | 58.0 | 58.0 | 59.0 | 59.0 |

(*)comparative.

The coating materials given in Table 3 (the amounts of the various components are expressed in % by weight with respect to the total weight of the coating material) were prepared as follows.

All the components reported in Table 3 were fed to a laboratory double-screw Brabender Plasticorder PL2000 and The data above reported show that the coating materials according to the present invention (Examples 4, 6, 7 and 8) show an improved stress cracking resistance with respect to both the coating materials devoided of non-ionic surfactant (Examples 1, 3, 5 and 9) and the coating material wherein a non-ionic surfactant including a homopolymer poly(oxyalkylene) chain is present (Example 2). Moreover, the addition of the non-ionic surfactant according to the present invention, does not negatively affect the hardness of the obtained coating material.

Examples 10-18

Small cables were then prepared by extruding the coating materials according to Examples 1-9 onto a single red copper wire with a cross-section of 1.5 mm², so as to obtain a 3.4 mm thick cable. The extrusion was carried out by means of a 45 mm Bandera single-screw extruder in 25 D configuration, with rotary speed of about 45 rev/min. The speed line was about 10 m/min, the temperature of the extrusion head was 180° C.

Samples were taken with hand punches from the extruded layer to measure its mechanical properties in accordance with CEI 20-34, section 5.1, with an Instron instrument at a draw speed of 25 mm/min. The obtained data are given in Table 5.

TABLE 5

| EXAMPLE | 10(*) | 11(*) | 12(*) | 13 | 14(*) | 15 | 16 | 17 | 18(*) |
|---|---|---|---|---|---|---|---|---|---|
| Stress at break (MPa) | 18.9 | 19.6 | 20.2 | 20.8 | 20.1 | 20.8 | 20.0 | 21.6 | 21.8 |
| Elongation at break (%) | 620 | 630 | 650 | 650 | 610 | 680 | 615 | 680 | 640 |

(*)comparative.

The data above reported show that the addition of the non-ionic surfactant according to the present invention (Examples 13, 15, 16 and 17) does not negatively affect the mechanical properties of the obtained coating materials.

The invention claimed is:

1. Cable including at least one core comprising at least one transmissive element and at least one polymeric coating layer made of a polymeric coating material, wherein said polymeric coating material comprises:
   polyethylene present in the polymeric coating material in an amount of from 80% by weight to 99% by weight with respect to the total weight of the polymeric coating material;
   at least one non-ionic surfactant having the following general formula (I):

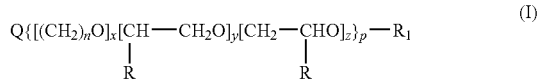

wherein:
   Q is a p-functional group;
   wherein R, R₁, n, x, y, z and p are independently selected for each variable as follows:
   $R_1$ is a hydrogen atom or a linear or branched $C_1$-$C_6$ alkyl group;
   R is a linear or branched $C_1$-$C_4$ alkyl group;
   n is an integer from 2 to 5 inclusive;
   x is an integer from 5 to 500 inclusive;
   y is an integer from 0 to 500 inclusive;
   z is an integer from 0 to 500 inclusive;
   y+z is not lower than 2;
   p is an integer from 1 to 4 inclusive; and
wherein said at least one polymeric coating layer is a radially outermost polymeric sheathing layer of the at least one core.

2. Cable according to claim 1, wherein Q is a group selected from:
   $OR_2$ groups wherein $R_2$ is a hydrogen atom, a linear or branched $C_1$-$C_4$ alkyl group, or a blend of a linear or branched $C_{13}$-$C_{15}$ alkyl groups;
   groups having the following structure:

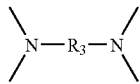

wherein $R_3$ is a linear or branched $C_2$-$C_6$ alkylene group.

3. Cable according to claim 1, wherein said polymeric coating layer has a protective function.

4. Cable according to claim 1, wherein the polyethylene is an ethylene homopolymer or a copolymer of ethylene with at least one α-olefin having a density of from 0.860 g/cm³ to 0.970 g/cm³.

5. Cable according to claim 4, wherein the α-olefin is an olefin of general formula CH₂═CH—R' in which R' represents a linear or branched alkyl group containing from 1 to 10 carbon atoms.

6. Cable according to claim 4, wherein the polyethylene is selected from: high density polyethylene (HDPE) having a density of at least 0.940 g/cm³; medium density polyethylene (MDPE) having a density of from 0.926 g/cm³ to 0.940 g/cm³; low density polyethylene (LDPE) and linear low density polyethylene (LLDPE) having a density of from 0.910 g/cm³ to 0.926 g/cm³.

7. Cable according to claim 1, wherein the polyethylene is present in the polymeric coating material in an amount of from 85% by weight to 95% by weight with respect to the total weight of the polymeric coating material.

8. Cable according to claim 1, wherein an amount of between 30% by weight and 90% by weight with respect to the total weight of the of the polymeric coating material of the polyethylene is obtained from waste material.

9. Cable according to claim 8, wherein the polyethylene obtained from waste material has a density not higher than 0.970 g/cm³ and a Melt Flow Index (MFI), measured at 190° C. with a load of 2.16 Kg according to ASTM D1238-00 standard, of from 0.01 g/10' to 2 g/10'.

10. Cable according to claim 9, wherein said polyethylene obtained from waste material has a density not lower than 0.910 g/cm³.

11. Cable according to claim 9, wherein said polyethylene obtained from waste material has a Melt Flow Index (MFI), measured at 190° C. with a load of 2.16 Kg according to ASTM D1238-00 standard, of from 0.05 g/10' to 1 g/10'.

12. Cable according to claim 8, wherein said polyethylene obtained from waste material has a melting point lower than 150° C.

13. Cable according to claim 12, wherein said polyethylene obtained from waste material has a melting point of from 100° C. to 140° C.

14. Cable according to claim 8, wherein said polyethylene obtained from waste material has a melting enthalpy ($\Delta H_m$) of from 50 J/g to 150 J/g.

15. Cable according to claim 14, wherein said polyethylene obtained from waste material has a melting enthalpy of from 80 J/g to 140 J/g.

16. Cable according to claim 8, wherein said polyethylene obtained from waste material comprises a carbon black in an amount higher than 2% by weight with respect to the total weight of the polyethylene.

17. Cable according to claim 8, wherein said polyethylene obtained from waste material is selected from low density polyethylene (LDPE), linear low density polyethylene (LLDPE), very low density polyethylene (VLDPE), or mixtures thereof.

18. Cable according to claim 8, wherein said polyethylene obtained from waste material is selected from mixtures of low density polyethylene including linear low density polyethylene in an amount not higher than 15% by weight with respect to the total weight of the polyethylene.

19. Cable according to claim 8, wherein said polyethylene obtained from waste material is present in the polymeric coating material in an amount of from 40% by weight to 60% by weight with respect to the total weight of the polymeric coating material.

20. Cable according to claim 8, wherein said polyethylene obtained from waste material is in a mixture with a second polyethylene having a density higher than 0.940 g/cm³.

21. Cable according to claim 20, wherein said second polyethylene has a density of from 0.942 g/cm³ to 0.965 g/cm³.

22. Cable according to claim 20, wherein said second polyethylene has a Melt Flow Index (MFI), measured at 190° C. with a load of 2.16 Kg according to ASTM D1238-00 standard, of from 0.05 g/10' to 2 g/10'.

23. Cable according to claim 20, wherein said second polyethylene has a melting point higher than 120° C.

24. Cable according to claim 20, wherein said second polyethylene has a melting enthalpy ($\Delta H_m$) of from 125 J/g to 200 J/g.

25. Cable according to claim 20, wherein said second polyethylene is a polyethylene obtained from waste material.

26. Cable according to claim 25, wherein said second polyethylene obtained from waste material comprises polypropylene in an amount not higher than 15% by weight with respect to the total weight of the polyethylene.

27. Cable according to claim 20, wherein said second polyethylene is present in the polymeric coating material in an amount of from 10% by weight to 70% by weight with respect to the total weight of the polymeric coating material.

28. Cable according to claim 27, wherein said second polyethylene is present in the polymeric coating material in an amount of from 40% by weight to 60% by weight with respect to the total weight of the polymeric coating material.

29. Cable according to claim 1, wherein the non-ionic surfactant having general formula (I) may be liquid or solid at room temperature and has an average molecular weight higher than 400.

30. Cable according to claim 29, wherein said non-ionic surfactant has an average molecular weight of from 600 to 20,000.

31. Cable according to claim 1, wherein said non-ionic surfactant having general formula (I) is selected from ethylene oxide/propylene oxide block copolymers having the following formulae (Ia) and (Ib):

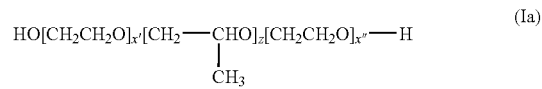
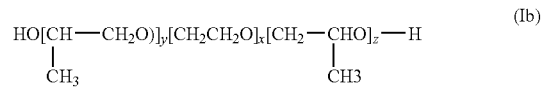

wherein x'+x"=x and x, y and z have the same meanings above reported.

32. Cable according to claim 31, wherein said ethylene oxide/propylene oxide block copolymers having formula (Ia) or (Ib) have an ethylene oxide content of from 50% by weight to 90% by weight with respect to the total weight of the ethylene oxide/propylene oxide block copolymers.

33. Cable according to claim 32, wherein said ethylene oxide/propylene oxide block copolymers having formula (Ia) or (Ib) have an ethylene oxide content of from 60% by weight to 80% by weight with respect to the total weight of the ethylene oxide/propylene oxide block copolymers.

34. Cable according to claim 1, wherein said non-ionic surfactant is present in the polymeric coating material in an amount of from 0.01% by weight to 3.0% by weight with respect to the total weight of the polymeric coating material.

35. Cable according to claim 34, wherein said non-ionic surfactant is present in the polymeric coating material in an amount of from 0.1% by weight to 1.0% by weight with respect to the total weight of the polymeric coating material.

36. Cable according to claim 1, wherein said polymeric coating material, in addition to the polyethylene, further comprises at least one copolymer of ethylene with at least one ethylenically unsaturated ester.

37. Cable according to claim 36, wherein said copolymer of ethylene with at least one ethylenically unsaturated ester is selected from: ethylene/vinylacetate copolymer (EVA), ethylene/ethylacrylate copolymer (EEA), ethylene/butylacrylate copolymer (EBA), or mixtures thereof.

38. Cable according to claim 36, wherein said copolymer of ethylene with at least one ethylenically unsaturated ester is present in the polymeric coating material in an amount of from 1.0% by weight to 10% by weight with respect to the total weight of the polymeric coating material.

39. Cable according to claim 1, wherein said polymeric coating material comprises a carbon black.

40. Cable according to claim 39, wherein said carbon black is added to the polymeric coating material in an amount of from 2% by weight to 5% by weight with respect to the total weight of the polymeric coating material.

41. Cable according to claim 39, wherein said carbon black is added to the polymeric coating material in an amount of from 2.5% by weight to 4.0% by weight with respect to the total weight of the polymeric coating material.

42. Cable according to claim 1, wherein said radially outermost polymeric sheathing layer comprises two layers: an inner layer made of the polymeric coating material, and an outer layer comprising a thermoplastic material.

43. The cable of claim 42 wherein the thermoplastic material is selected from flexible polyvinyl chloride (PVC), uncross-linked polyethylene, uncross-linked homopolymer or copolymer of propylene, or a flame retardant composition.

44. Method for improving environmental stress cracking resistance of a cable including at least one core comprising at least one transmissive element and at least one polymeric coating layer, wherein the method comprises applying, around said at least one transmissive element, a radially outermost polymeric sheathing layer made of a polymeric coating material comprising:
polyethylene present in the polymeric coating material in an amount of from 80% by weight to 99% by weight with respect to the total weight of the polymeric coating material;
at least one non-ionic surfactant having the general formula (I):

$$Q\{[(CH_2)_nO]_x[\underset{R}{CH-CH_2O}]_y[\underset{R}{CH_2-CHO}]_z\}_p - R_1 \quad (I)$$

wherein:
Q is a p-functional group;
wherein R, $R_1$, n, x, y, z and p are independently selected for each variable as follows:
$R_1$ is a hydrogen atom or a linear or branched $C_1$-$C_6$ alkyl group;
R is a linear or branched $C_1$-$C_4$ alkyl group;
n is an integer from 2 to 5 inclusive;
x is an integer from 5 to 500 inclusive;
y is an integer from 0 to 500 inclusive;
z is an integer from 0 to 500 inclusive;
y+z is not lower than 2;
p is an integer from 1 to 4 inclusive.

45. Method according to claim 44, wherein said polyethylene is an ethylene homopolymer or a copolymer of ethylene with at least one α-olefin having a density of from 0.860 g/cm³ to 0.970 g/cm³.

46. Method according to claim 44, wherein said polymeric coating material comprises at least one copolymer of ethylene with at least one ethylenically unsaturated ester which is selected from: ethylene/vinylacetate copolymer (EVA), ethylene/ethylacrylate copolymer (EEA), ethylene/butylacrylate copolymer (EBA), or mixtures thereof.

47. Method according to claim 44, wherein said polymeric coating material comprises a carbon black added to the coating material in an amount of from 2% by weight to 5% by weight with respect to the total weight of the polymeric coating material.

48. Cable including at least one core comprising at least one transmissive element and at least one polymeric coating layer made of a polymeric coating material, wherein said polymeric coating material comprises:
polyethylene present in the polymeric coating material in an amount of from 80% by weight to 99% by weight with respect to the total weight of the polymeric coating material;
at least one non-ionic surfactant having the following general formula (Ic):

$$\begin{array}{c} H-(OB)_{q'}(OA)_q \\ \diagdown \\ N-CH_2CH_2-N \\ \diagup \\ H-(OB)_{q'}(OA)_q \end{array} \begin{array}{c} (AO)_q(BO)_{q'}-H \\ \diagup \\ \diagdown \\ (AO)_q(BO)_{q'}-H \end{array} \quad (Ic)$$

wherein A is propylene and B is ethylene, q independently in each instance is an integer from 1 to 30 inclusive and q' independently in each instance is an integer from 1 to 150 inclusive; and
wherein said at least one polymeric coating layer is a radially outermost polymeric sheathing layer of the at least one core.

49. Cable according to claim 48, wherein said non-ionic surfactant is present in the polymeric coating material in an amount of from 0.01% by weight to 3.0% by weight with respect to the total weight of the polymeric coating material.

50. Cable according to claim 48, wherein said polymeric coating layer has a protective function.

51. Method for improving environmental stress cracking resistance of a cable including at least one core comprising at least one transmissive element and at least one polymeric coating layer, wherein the method comprises applying, around said at least one transmissive element, a radially outermost polymeric sheathing layer made of a polymeric coating material comprising:
polyethylene present in the polymeric coating material in an amount of from 80% by weight to 99% by weight with respect to the total weight of the polymeric coating material;
at least one non-ionic surfactant having the following general formula (Ic):

$$\begin{array}{c} H-(OB)_{q'}(OA)_q \\ \diagdown \\ N-CH_2CH_2-N \\ \diagup \\ H-(OB)_{q'}(OA)_q \end{array} \begin{array}{c} (AO)_q(BO)_{q'}-H \\ \diagup \\ \diagdown \\ (AO)_q(BO)_{q'}-H \end{array} \quad (Ic)$$

wherein A is propylene and B is ethylene, q independently in each instance is an integer from 1 to 30 inclusive and q' independently in each instance is an integer from 1 to 150 inclusive.

52. Optical cable including at least one core comprising a plurality of tubes made of a polymeric material, the tubes housing at least one optical fibre and being surrounded by a radially outermost polymeric sheath layer made of a polymeric material having one or more layers made of a polymeric coating material comprising:
polyethylene present in the polymeric coating material in an amount of from 80% by weight to 99% by weight with respect to the total weight of the polymeric coating material;
at least one non-ionic surfactant having the following general formula (I):

$$Q\{[(CH_2)_nO]_x[\underset{R}{CH-CH_2O}]_y[\underset{R}{CH_2-CHO}]_z\}_p - R_1 \quad (I)$$

wherein:
Q is a p-functional group;
wherein R, $R_1$, n, x, y, z and p are independently selected for each variable as follows:
$R_1$ is a hydrogen atom or a linear or branched $C_1$-$C_6$ alkyl group;
R is a linear or branched $C_1$-$C_4$ alkyl group;
n is an integer from 2 to 5 inclusive;
x is an integer from 5 to 500 inclusive;
y is an integer from 0 to 500 inclusive;
z is an integer from 0 to 500 inclusive;
y+z is not lower than 2;
p is an integer from 1 to 4 inclusive.

53. Optical cable including at least one core comprising a plurality of tubes made of a polymeric material, the tubes housing at least one optical fibre and being surrounded by a radially outermost polymeric sheath layer made of a polymeric material having one or more layers made of a polymeric coating material comprising:

polyethylene present in the polymeric coating material in an amount of from 80% by weight to 99% by weight with respect to the total weight of the polymeric coating material;

at least one non-ionic surfactant having the following general formula (Ic):

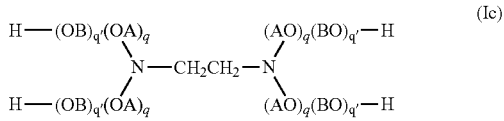

wherein A is propylene and B is ethylene, q independently in each instance is an integer from 1 to 30 inclusive and q' independently in each instance is an integer from 1 to 150 inclusive.

54. Optical cable including a central grooved core housing at least one optical fibre, the grooved core being surrounded by a plurality of layers at least one of which is made of a polymeric material comprising:

polyethylene present in the polymeric coating material in an amount of from 80% by weight to 99% by weight with respect to the total weight of the polymeric coating material;

at least one non-ionic surfactant having the following general formula (I):

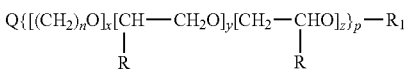

wherein:

Q is a p-functional group;

wherein R, $R_1$, n, x, y, z and p are independently selected for each variable as follows:

$R_1$ is a hydrogen atom or a linear or branched $C_1$-$C_6$ alkyl group;

R is a linear or branched $C_1$-$C_4$ alkyl group;

n is an integer from 2 to 5 inclusive;

x is an integer from 5 to 500 inclusive;

y is an integer from 0 to 500 inclusive;

z is an integer from 0 to 500 inclusive;

y+z is not lower than 2;

p is an integer from 1 to 4 inclusive.

55. Optical cable including a central grooved core housing at least one optical fibre, the grooved core being surrounded by a plurality of layers at least one of which is made of a polymeric material comprising:

polyethylene present in the polymeric coating material in an amount of from 80% by weight to 99% by weight with respect to the total weight of the polymeric coating material;

at least one non-ionic surfactant having the following general formula (Ic):

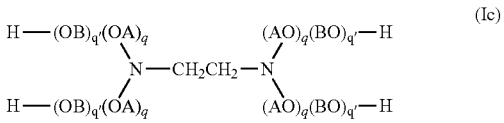

wherein A is propylene and B is ethylene, q independently in each instance is an integer from 1 to 30 inclusive and q' independently in each instance is an integer from 1 to 150 inclusive.

* * * * *